US012576333B2

(12) United States Patent
Chen et al.

(10) Patent No.: US 12,576,333 B2
(45) Date of Patent: Mar. 17, 2026

(54) GAMING JOYSTICK AND BUTTON MECHANISM THEREOF

(71) Applicant: Quanta Computer Inc., Taoyuan City (TW)

(72) Inventors: Yu-Chun Chen, Taoyuan City (TW); Chang-En Tsai, Taoyuan City (TW); Bing-Kai Huang, Taoyuan City (TW); Chun-Lung Chen, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 258 days.

(21) Appl. No.: 18/493,954

(22) Filed: Oct. 25, 2023

(65) Prior Publication Data

US 2025/0065224 A1     Feb. 27, 2025

(30) Foreign Application Priority Data

Aug. 25, 2023    (TW) ................................. 112209108

(51) Int. Cl.
*A63F 13/24*          (2014.01)
(52) U.S. Cl.
CPC .................................. *A63F 13/24* (2014.09)

(58) Field of Classification Search
CPC ....................................................... A63F 13/24
See application file for complete search history.

(56) References Cited

U.S. PATENT DOCUMENTS

| | | | |
|---|---|---|---|
| 2018/0018020 A1* | 1/2018 | Grant .................... | G06F 3/0338 |
| 2018/0250587 A1* | 9/2018 | Strahle ................... | A63F 13/25 |
| 2021/0252390 A1* | 8/2021 | Schmitz ................. | G06F 3/016 |
| 2022/0305376 A1* | 9/2022 | Orion ..................... | A63F 13/24 |
| 2025/0065227 A1* | 2/2025 | Morita ................... | A63F 13/21 |

\* cited by examiner

*Primary Examiner* — Peter J Iannuzzi
(74) *Attorney, Agent, or Firm* — McClure, Qualey & Rodack, LLP

(57)                    ABSTRACT

A button mechanism is provided, including a frame, a motor disposed on the frame, a rotary member connected to the motor, a protrusion disposed on the rotary member, and a movable member hinged to the frame. When the movable member moves relative to the frame in the first direction, the protrusion contacts the movable member, and the rotary member is driven by the motor to rotate, whereby the movable member is pushed back by the protrusion so that it moves in the second direction, which is the opposite of the first direction.

9 Claims, 15 Drawing Sheets

100

100

M2

GAMING JOYSTICK AND BUTTON MECHANISM THEREOF

CROSS REFERENCE TO RELATED APPLICATIONS

This Application claims priority of Taiwan Patent Application No. 112209108, filed on Aug. 25, 2023, the entirety of which is incorporated by reference herein.

BACKGROUND OF THE INVENTION

Field of the Invention

The present invention relates to a gaming joystick, and, in particular, to a gaming joystick with an active force feedback function, and the button mechanism thereof.

Description of the Related Art

Conventional button mechanisms in gaming joysticks usually do not have the function of active force feedback. Moreover, since the tactile feeling of the button is usually not adjustable, it adversely affects the enjoyability and the virtual-reality experience when playing video games.

To address the aforementioned disadvantages of conventional gaming joysticks, it has become a challenge to design a button mechanism for joysticks with an active force feedback function.

BRIEF SUMMARY OF THE INVENTION

An embodiment of the present invention provides a button mechanism that includes a frame, a motor disposed on the frame, a rotary member connected to the motor, a protrusion disposed on the rotary member, and a movable member hinged to the frame. When the movable member moves relative to the frame in the first direction, the protrusion contacts the movable member, and the rotary member is driven by the motor to rotate, whereby the movable member is pushed back by the protrusion, causing it to move in the second direction, which is the opposite of the first direction.

In some embodiments, the protrusion includes a universal ball roller.

In some embodiments, when the movable member moves relative to the frame from the initial position in the first direction to the triggering position, the rotary member is driven by the motor to rotate from a first angle to a second angle, and the protrusion moves from the 6 o'clock position on the main surface to the 12 o'clock position on the main surface.

An embodiment of the present invention further provides a button mechanism that includes a frame, a motor disposed on the frame, a rotary member connected to the motor, a protrusion disposed on the main surface of the rotary member, a movable member hinged to the frame, and a metal piece affixed to the movable member. When the movable member moves relative to the frame from the initial position in the first direction to the triggering position, the protrusion contacts the metal piece, and the rotary is driven by the motor to rotate, whereby the protrusion pushes the movable member in the second direction.

In some embodiments, the button mechanism further includes a gear rack connected to the movable member, a gear engaged with the gear rack, and a variable resistor connected to the gear, wherein when the movable member moves relative to the frame, the gear is driven by the movable member to rotate via the gear rack and change the resistance value of the variable resistor In some embodiments, the button mechanism further includes a circuit board affixed to the frame, a magnetic field sensing element disposed on the circuit board, and a magnetic element disposed on the movable member.

In some embodiments, the button mechanism further includes a circuit board and a proximity sensor, wherein the circuit board is affixed to the frame, and the proximity sensor is disposed on the circuit board to detect the position of the movable member.

In some embodiments, the button mechanism further includes a conductive wire electrically connected to the metal piece.

An embodiment of the present invention further provides a gaming joystick that includes a housing and the button mechanism, wherein the movable member is exposed to a side of the housing.

In some embodiments, the button mechanism further comprises a resilient member connecting the movable member to the housing.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the gaming joystick and button mechanism thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
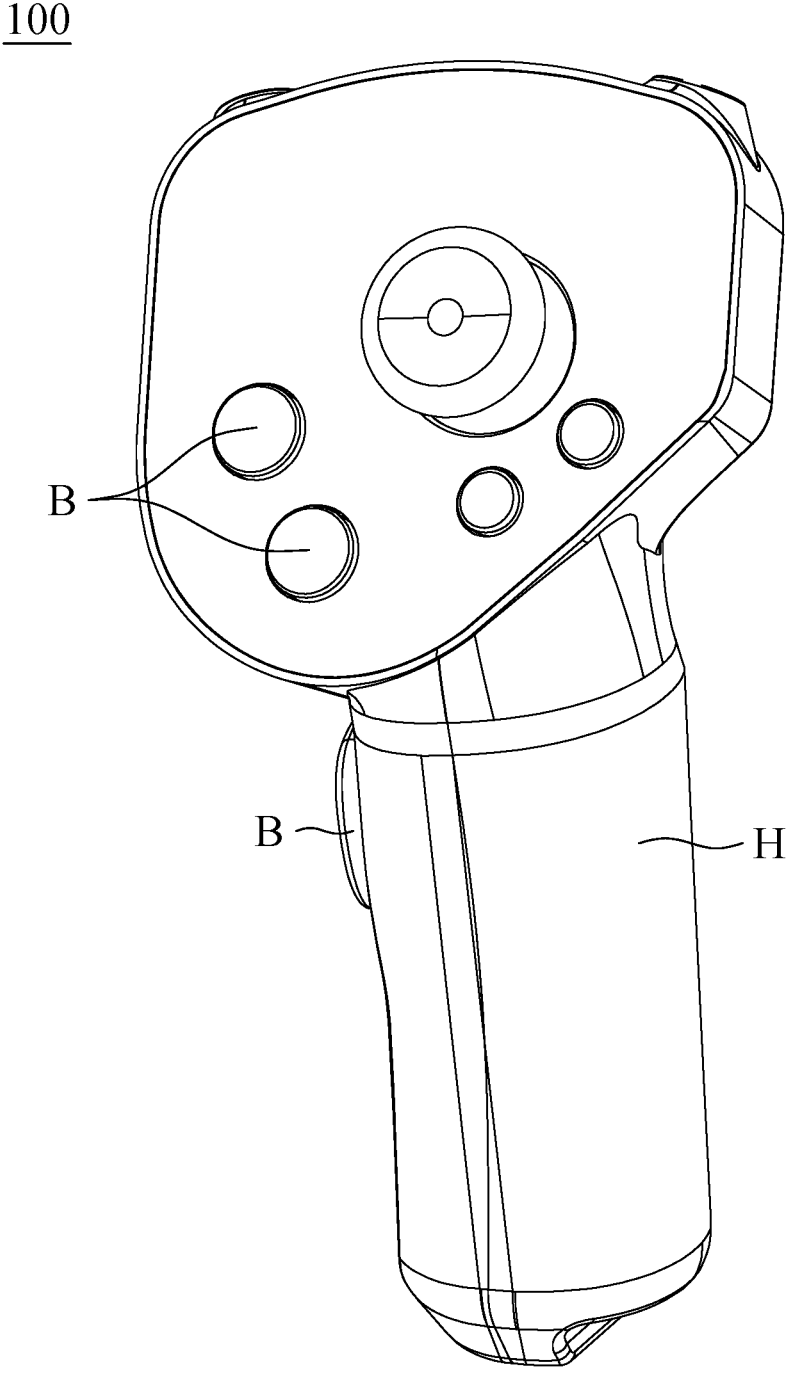
FIG. 1 is a perspective diagram of a gaming joystick 100 in accordance with an embodiment of the invention.
Figure 2:
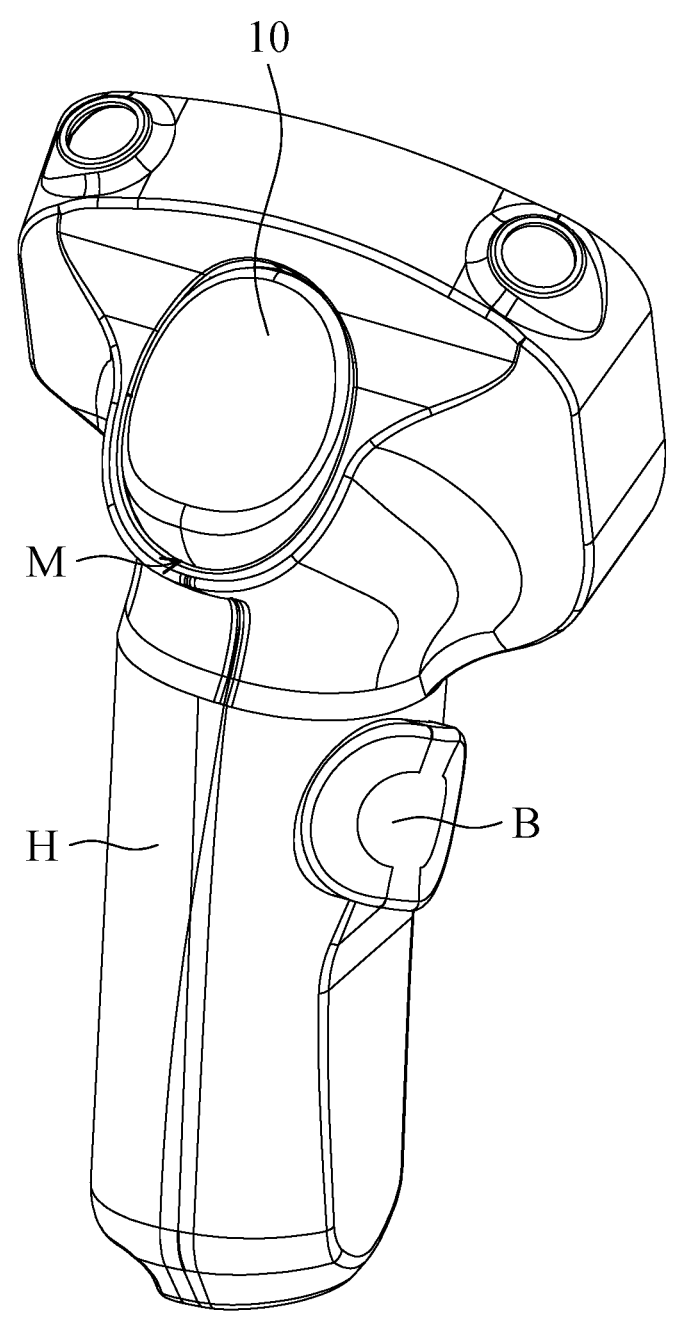
FIG. 2 is another perspective diagram of the gaming joystick 100 in FIG. 1.

FIG. 1 is a perspective diagram of a gaming joystick 100 in accordance with an embodiment of the invention. FIG. 2 is another perspective diagram of the gaming joystick 100 in FIG. 1.

Referring to FIGS. 1 and 2, an embodiment of the gaming joystick 100 primarily comprises a housing H, several round pushbuttons B, and a button mechanism M. The pushbuttons B are exposed to the front and lateral sides of the housing H. The button mechanism M is disposed in the housing H, wherein a movable member 10 of the button mechanism M is exposed to the rear side of the housing H (FIG. 2).

In this embodiment, the button mechanism M has the function of active force feedback, whereby the users can have good tactile feedback experience when playing video games with the gaming joystick 100.

Figure 3:
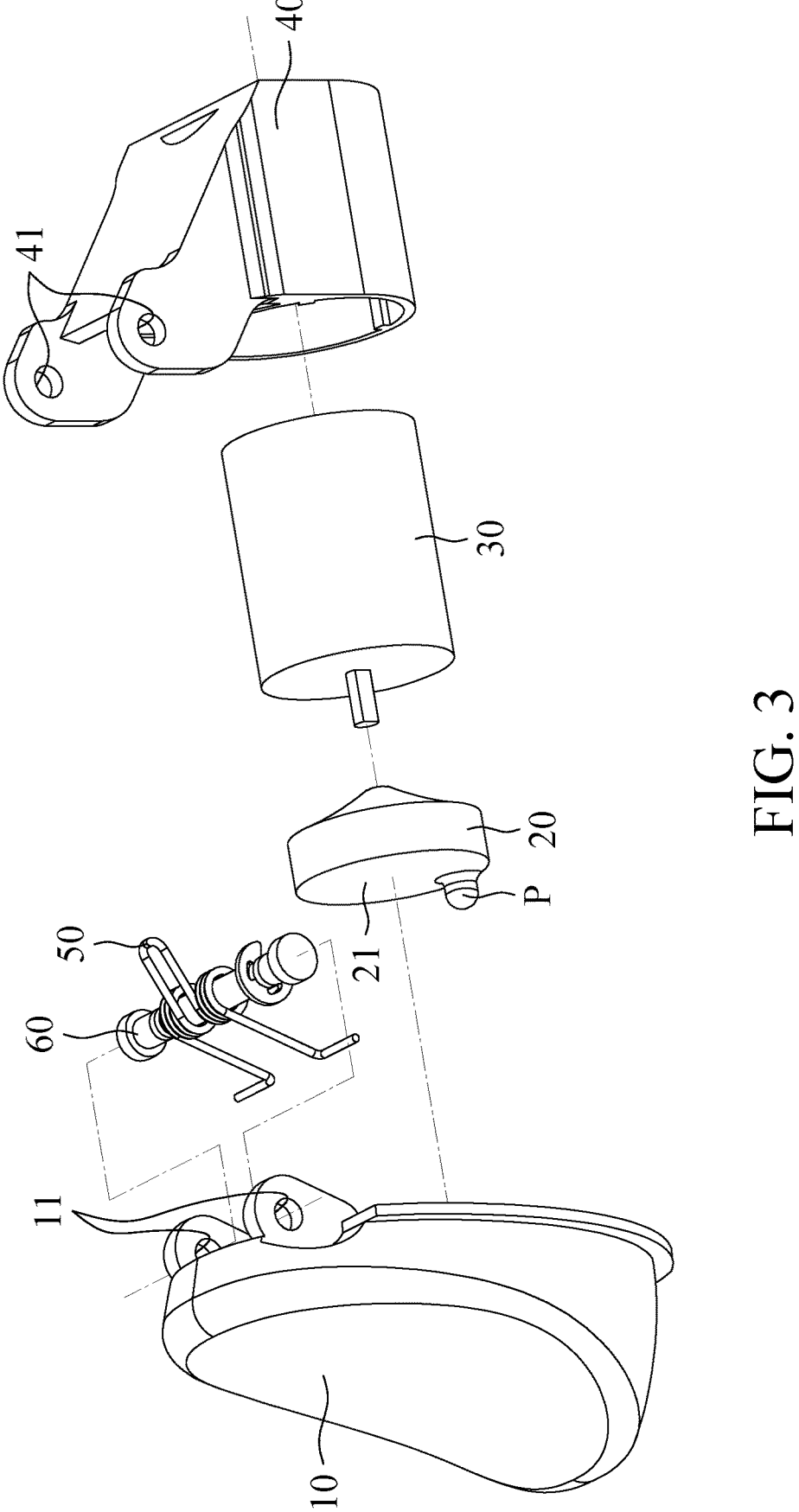
FIG. 3 is an exploded diagram of the button mechanism M in FIG. 2.
Figure 4:
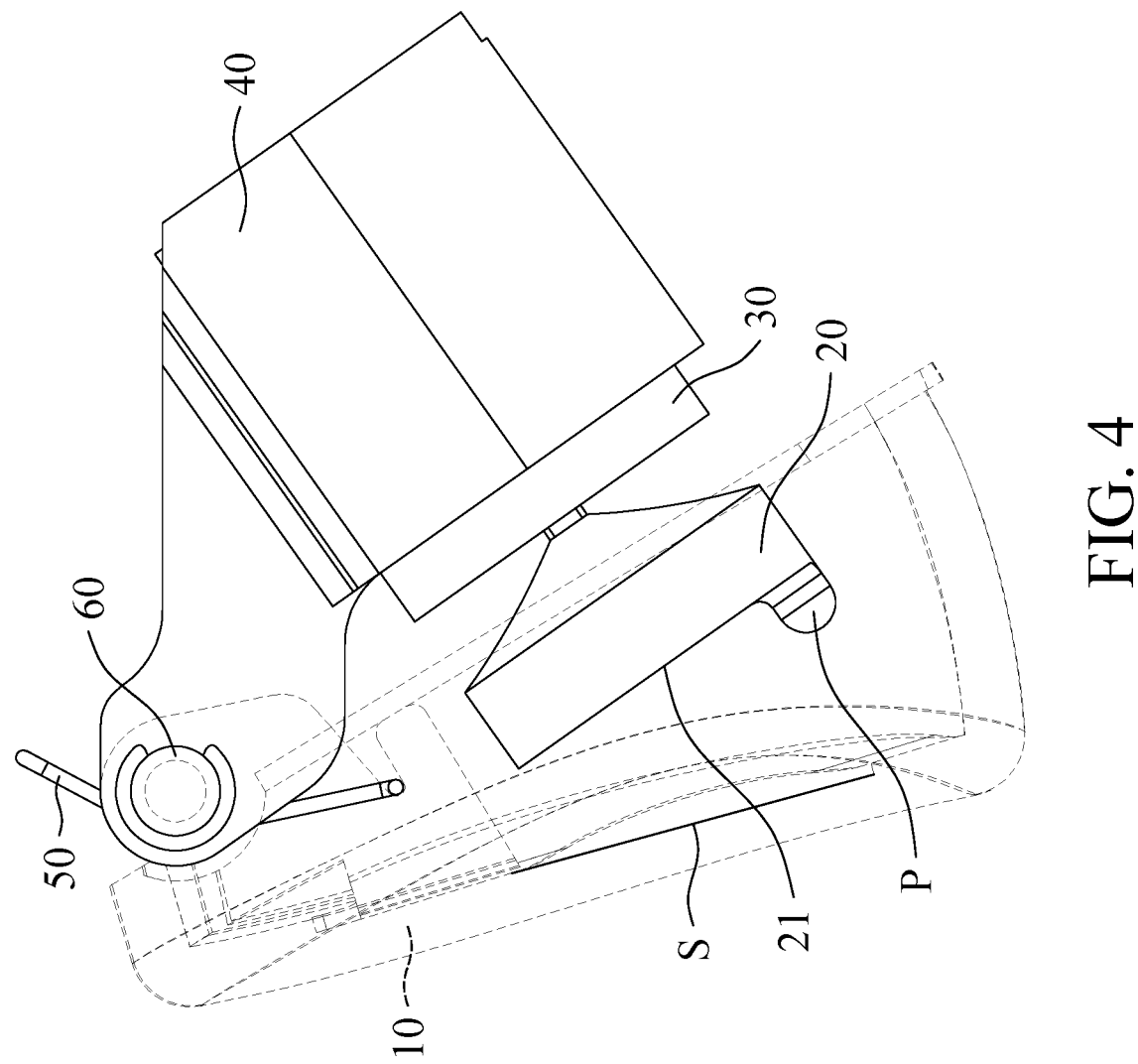
FIG. 4 is a side view of the button mechanism M in FIG. 3 after assembly.

FIG. 3 is an exploded diagram of the button mechanism M in FIG. 2. FIG. 4 is a side view of the button mechanism M in FIG. 3 after assembly.

Referring to FIGS. 3 and 4, the button mechanism M primarily comprises a movable member 10, a rotary member 20, a motor 30, a frame 40, a resilient member 50, and a hinge 60. The movable member 10 is exposed to the rear side of the housing H after assembly of the gaming joystick 100. The motor 30 is disposed in the frame 40 and connected to the rotary member 20. The hinge 60 extends through the resilient member 50, the holes 11 of the movable member 10, and the holes 41 of the frame 40, whereby the movable member 10 is pivotally connected to the frame 40.

When using the gaming joystick 100, the user can press the movable member 10 so that the movable member 10 rotates relative to the frame 40 toward the rotary member 20. Specifically, when the contact surface S (e.g. smooth flat surface) of the movable member 10 contacts the protrusion P on the main surface 21 of the rotary member 20, a pressing angle detection module (not shown) inside the housing H can detect the position of the movable member 10, thereby performing a specific instruction (e.g. shooting a gun or drawing the bow) of the game.

In this embodiment, the frame 40 is affixed in the housing H of the gaming joystick 100. The resilient member 50 comprises a torsional spring with one end abutting the inner surface of the movable member 10 and the other end connected to the housing H. It should be noted that the resilient member 50 can provide a resistance force when the user presses the movable member 10. Moreover, when the user releases the movable member 10, the resilient member 50 can also provide a restoring force to bring the movable member 10 back to the initial position as shown in FIG. 4.

Figure 5:
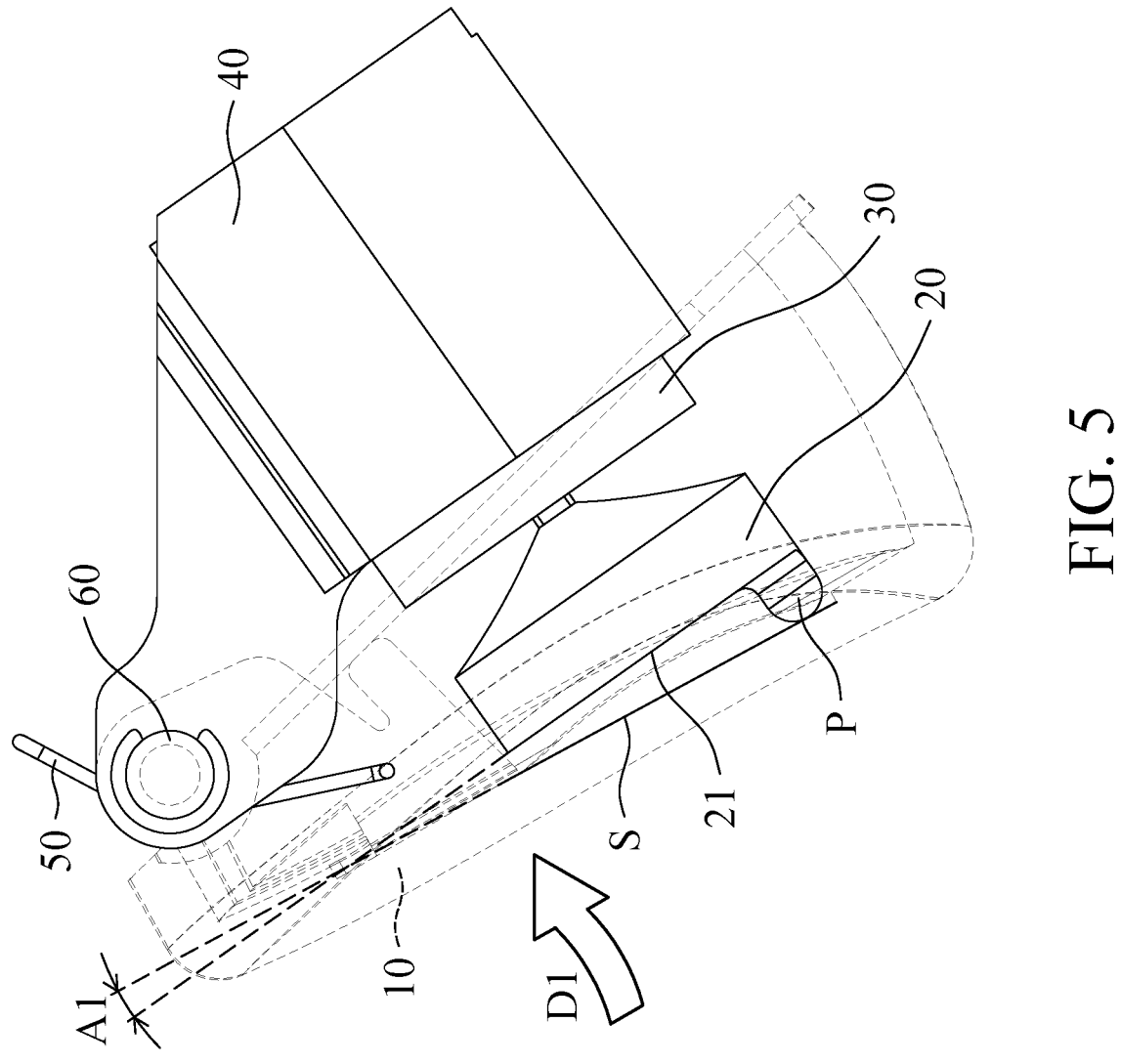
FIG. 5 is a schematic diagram showing the movable member 10 when moving in the first direction D1 to contact the protrusion P of the rotary member 20.
Figure 6:
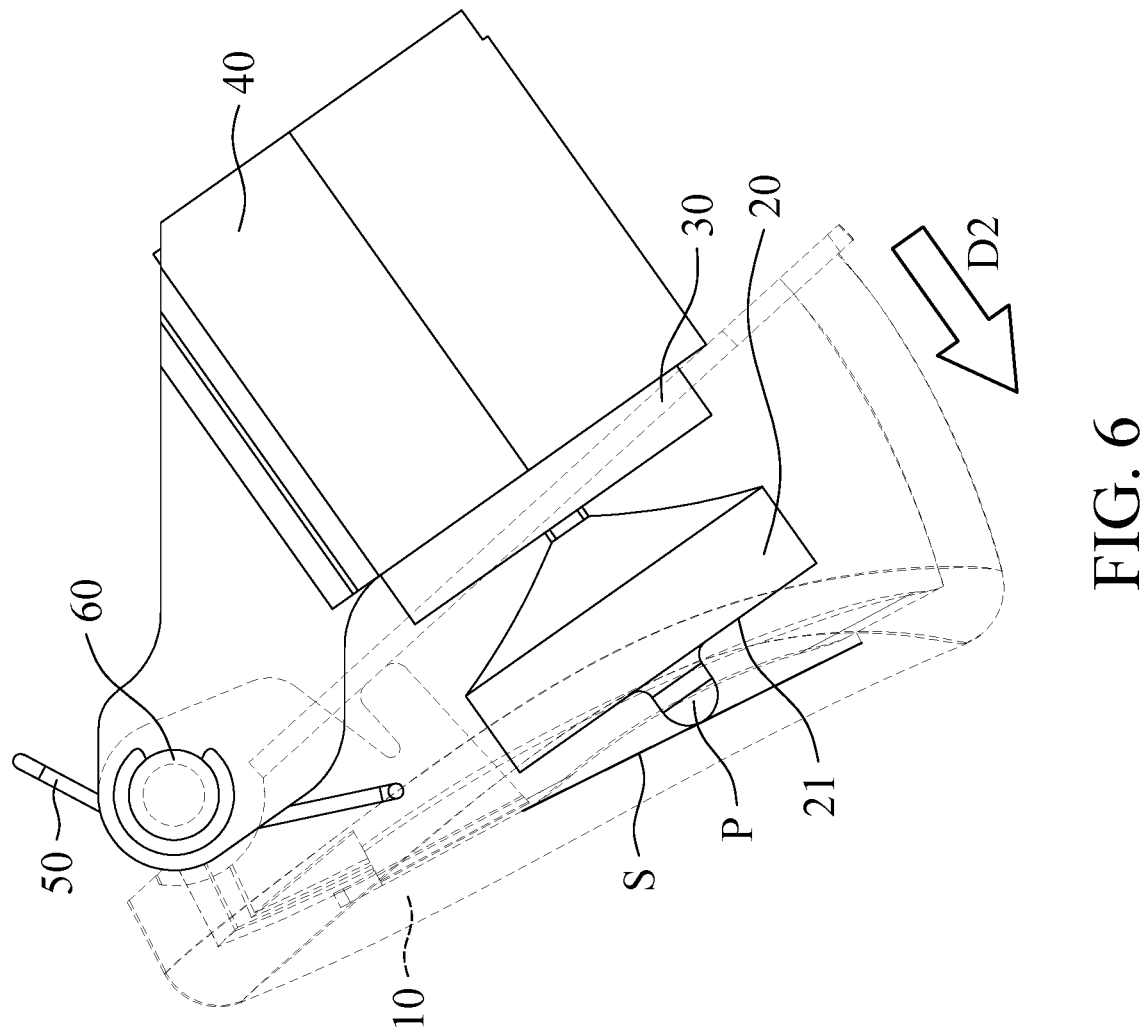
FIG. 6 is a schematic diagram showing the rotary member 20 when rotating from the first angle of FIG. 5 to a transitional angle and pushing the movable member 10 back in a second direction D2.
Figure 7:
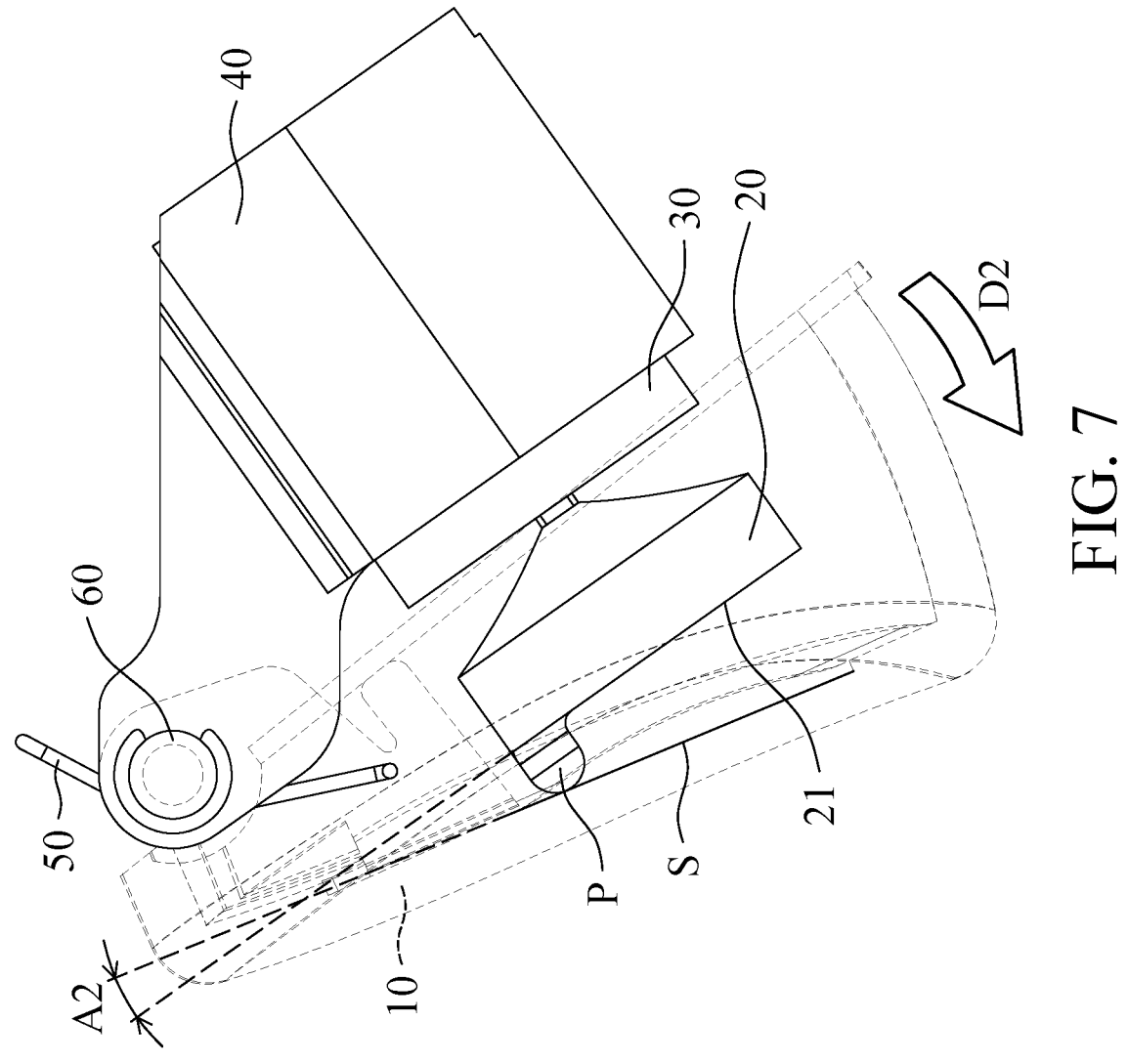
FIG. 7 is a schematic diagram showing the rotary member 20 when rotating from the transitional angle of FIG. 6 to a second angle and pushing the movable member 10 further back in the second direction D2.

FIG. 5 is a schematic diagram showing the movable member 10 when moving in the first direction D1 to contact the protrusion P of the rotary member 20. FIG. 6 is a schematic diagram showing the rotary member 20 when rotating from the first angle of FIG. 5 to a transitional angle and pushing the movable member 10 back in a second direction D2. FIG. 7 is a schematic diagram showing the rotary member 20 when rotating from the transitional angle of FIG. 6 to a second angle and pushing the movable member 10 further back in the second direction D2.

To send a specific instruction (e.g. shooting a gun or drawing the bow) to the gaming joystick 100 through the button mechanism M, the user can press the movable member 10 by the finger (e.g. thumb), whereby the movable member 10 moves relative to the rotary member 20, the motor 30, and the frame 40 in the first direction D1 (FIG. 5). Hence, the contact surface S contacts the protrusion P of the rotary member 20, and the movable member 10 is in a trigger position. In this state, a first included angle A1 is formed between the contact surface S of the movable member 10 and the main surface 21 of the rotary member 20.

It should be noted that during the movement of the movable member 10 from the initial position of FIG. 4 to the trigger position of FIG. 5, the rotary member 20 remains in a first angle, wherein the protrusion P is in the 6 o'clock position on the main surface 21 of the rotary member 20 (FIG. 4).

When the movable member 10 is pressed to the trigger position as shown in FIG. 5, the pressing angle detection module inside the housing H can detect the position of the movable member 10 and actuate the motor 30. The motor 30 then impels the rotary member 20 to rotate from the first angle around the central axis thereof to a transitional angle, thereby pushing the movable member 10 back in a second direction D2, as shown in FIG. 6. When the rotary member 20 rotates to the transitional angle, the protrusion P is in the 3 or 9 o'clock position on the main surface 21 of the rotary member 20.

With the motor 30 continuously impelling the rotary member 20 to rotate, the rotary member 20 can rotate from the transitional angle to a second angle, as showing in FIG. 7, thereby pushing the movable member 10 further back in the second direction D2. When the rotary member 20 rotates to the second angle, the protrusion P is in the 12 o'clock position on the main surface 21 of the rotary member 20, and a second included angle A2 is formed between the contact surface S of the movable member 10 and the main surface 21 of the rotary member 20. The second included angle A2 is greater than the first included angle A1.

In this embodiment, the main surface 21 is perpendicular to the rotary axis (central axis) of the rotary member 20. The second direction D2 and the first direction D1 are in opposite directions.

In some embodiments, the first included angle A1 is ranged from 5 to 10 degree (e.g. 7 degree), and the second included angle A2 is ranged from 11 to 15 degree (e.g. 12.7 degree). However, the first and second included angles A1 and A2 can be appropriately adjusted according to the mechanism design requirement, and they are not limited to the embodiments of the invention.

Figure 8:
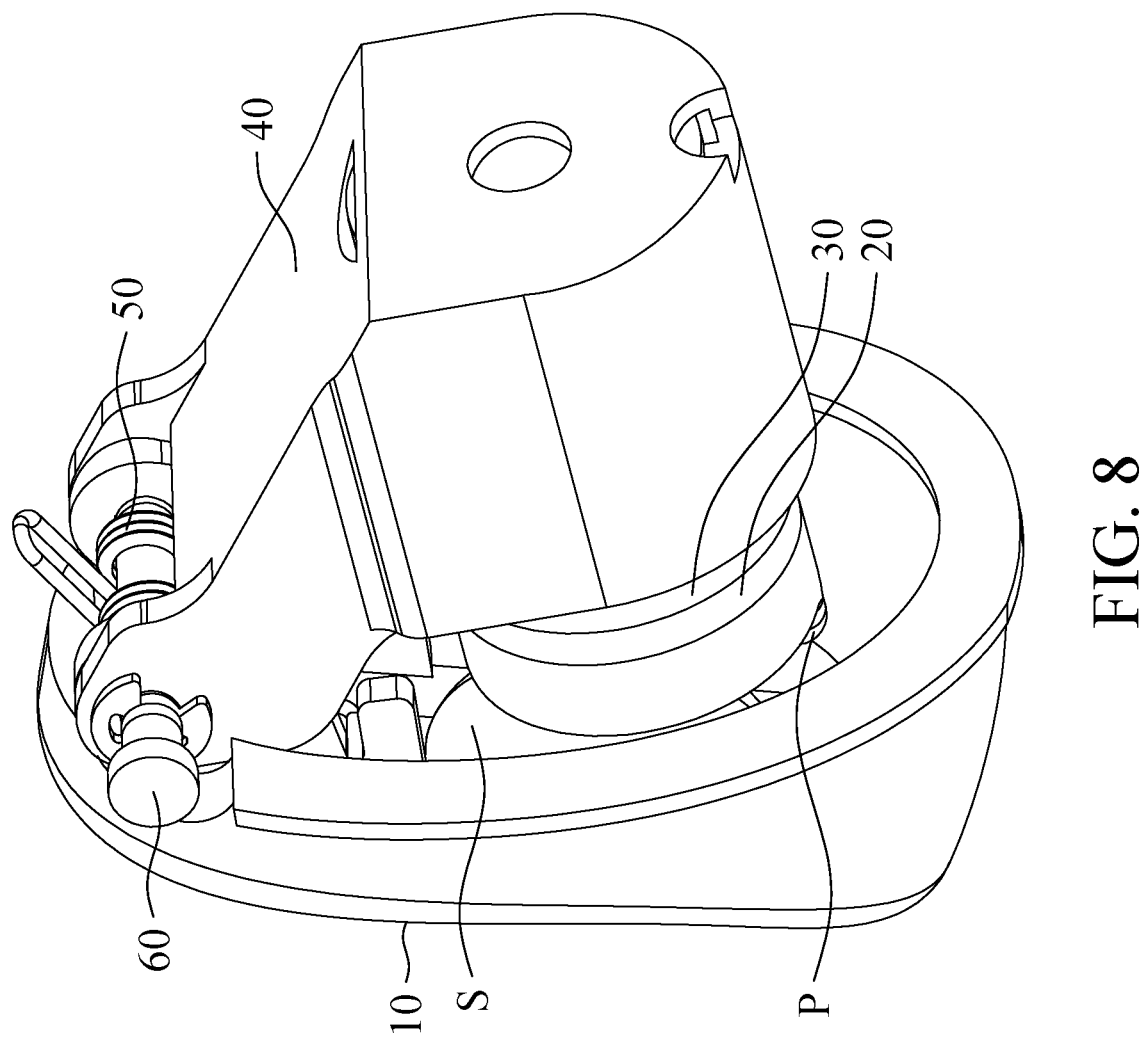
FIG. 8 is a perspective diagram of the button mechanism M in FIG. 3 after assembly.

FIG. 8 is a perspective diagram of the button mechanism M in FIG. 3 after assembly. As shown in FIG. 8, the contact surface S is located on the inner side of the movable member 10 and faces the rotary member 20. In this embodiment, the contact surface S is a smooth flat surface. In some embodiments, the contact surface S may be a curved surface or other smooth surfaces, not limited to the embodiments of the invention.

Figure 9:
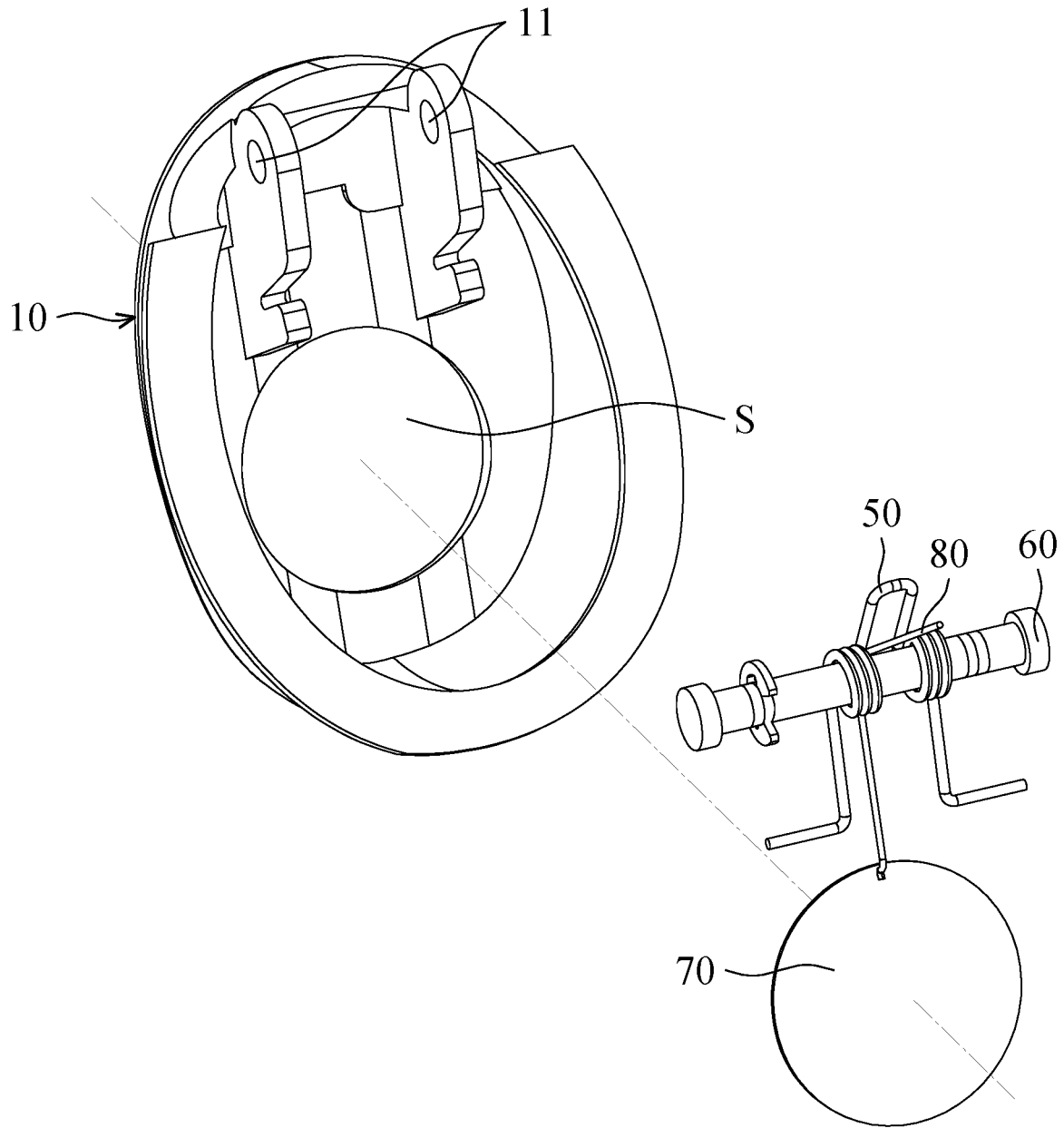
FIG. 9 is a perspective diagram of a metal piece 70 and a conductive wire 80 disposed on the inner side of the movable member 10.
Figure 10:
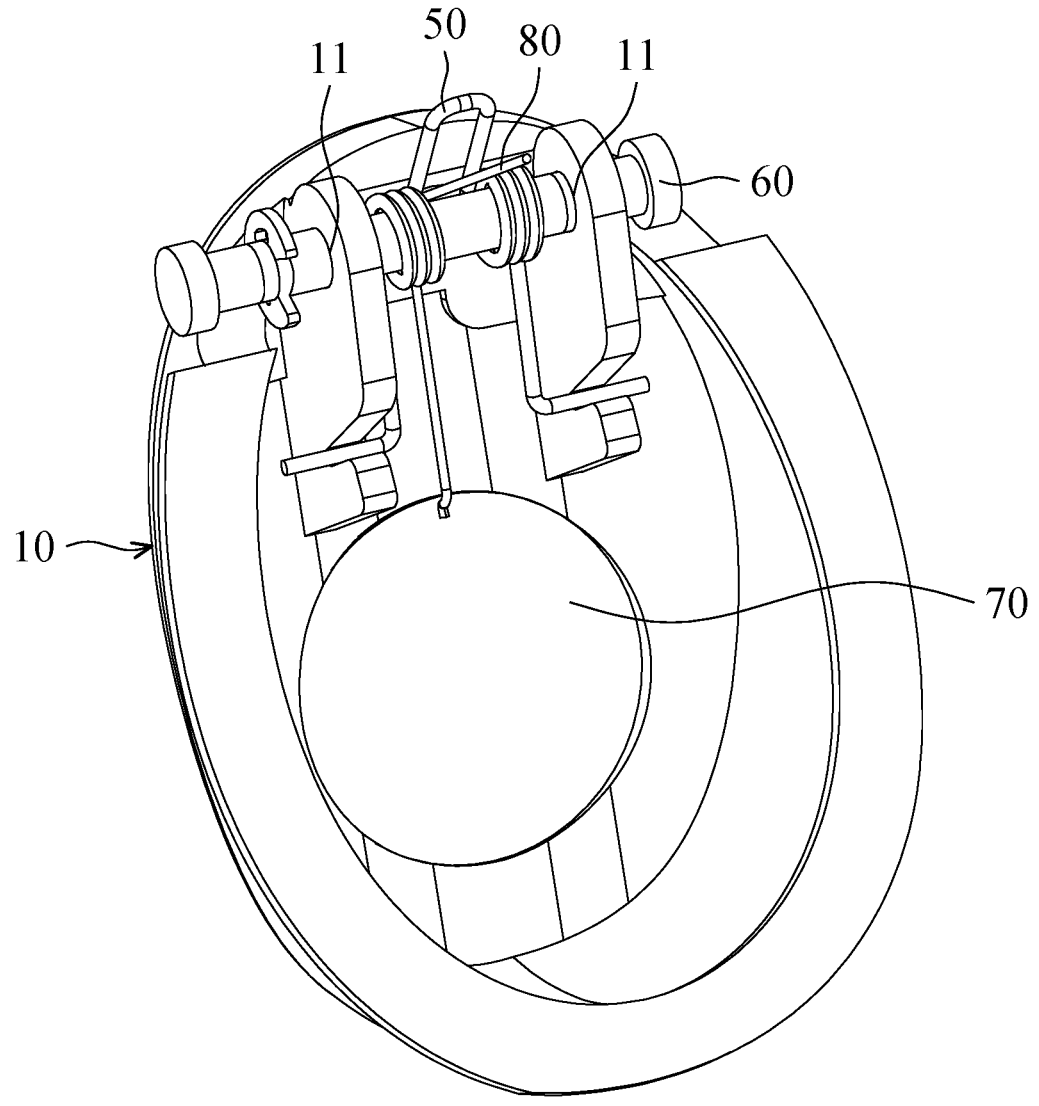
FIG. 10 is a perspective diagram of the movable member 10, the resilient member 50, the hinge 60, the metal piece 70, and the conductive wire 80 after assembly.

FIG. 9 is a perspective diagram of a metal piece 70 and a conductive wire 80 disposed on the inner side of the movable member 10. FIG. 10 is a perspective diagram of the movable member 10, the resilient member 50, the hinge 60, the metal piece 70, and the conductive wire 80 after assembly.

Referring to FIGS. 9-10, to prevent abrasion of the protrusion P of the rotary member 20 and the contact surface S of the movable member 10 due to rotation of the rotary member 20, a metal piece 70 and a conductive wire 80 are provided on the inner side of the movable member 10. Here, the metal piece 70 has a round and thin structure, and it forms a smooth and wear-resisting surface (e.g. flat surface) to contact the protrusion P of the rotary member 20.

When the movable member 10 moves in the first direction D1 to the trigger position (FIG. 5), the metal piece 70 can replace the contact surface S on the inner side of the movable member 10 to contact the protrusion P of the rotary member 20, whereby the protrusion P can smooth slide on the wear-resisting surface of the metal piece 70.

In this embodiment, the metal piece 70 is affixed to the contact surface S of the movable member 10. An end of the conductive wire 80 is electrically connected to the metal piece 70, and the other end of the conductive wire 80 is connected to a capacitive sensor (not shown) inside the housing H. The capacitive sensor can detect the capacitive variation on the surface of the metal piece 70, so as to determine whether the finger of the user is close to or in contact with the movable member 10 (e.g. determining if the finger is located on the movable member 10 and therefore ready to pull the trigger using the gaming joystick 100).

Figure 11:
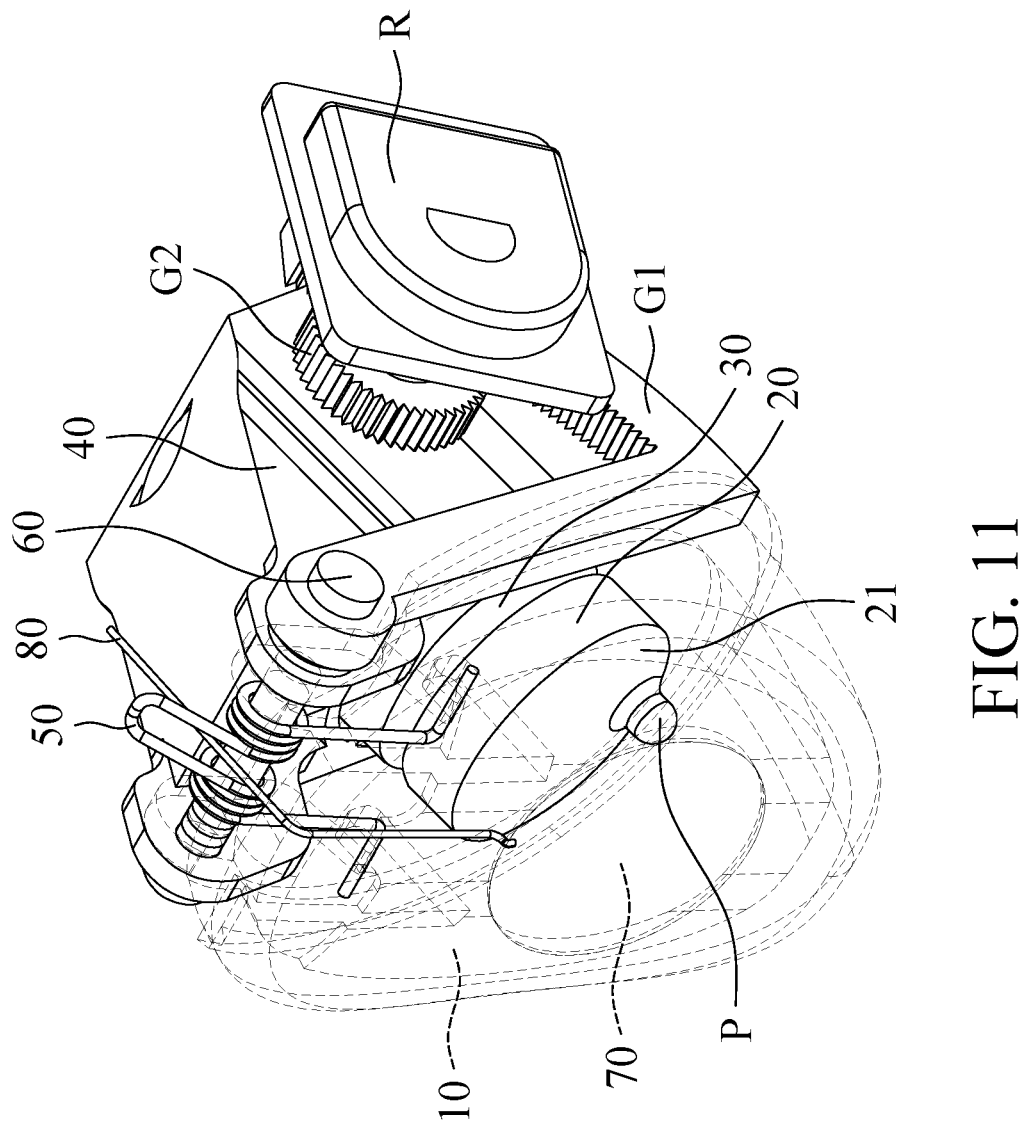
FIG. 11 is a schematic diagram of a button mechanism M1, in accordance with another embodiment of the invention.
Figure 12:
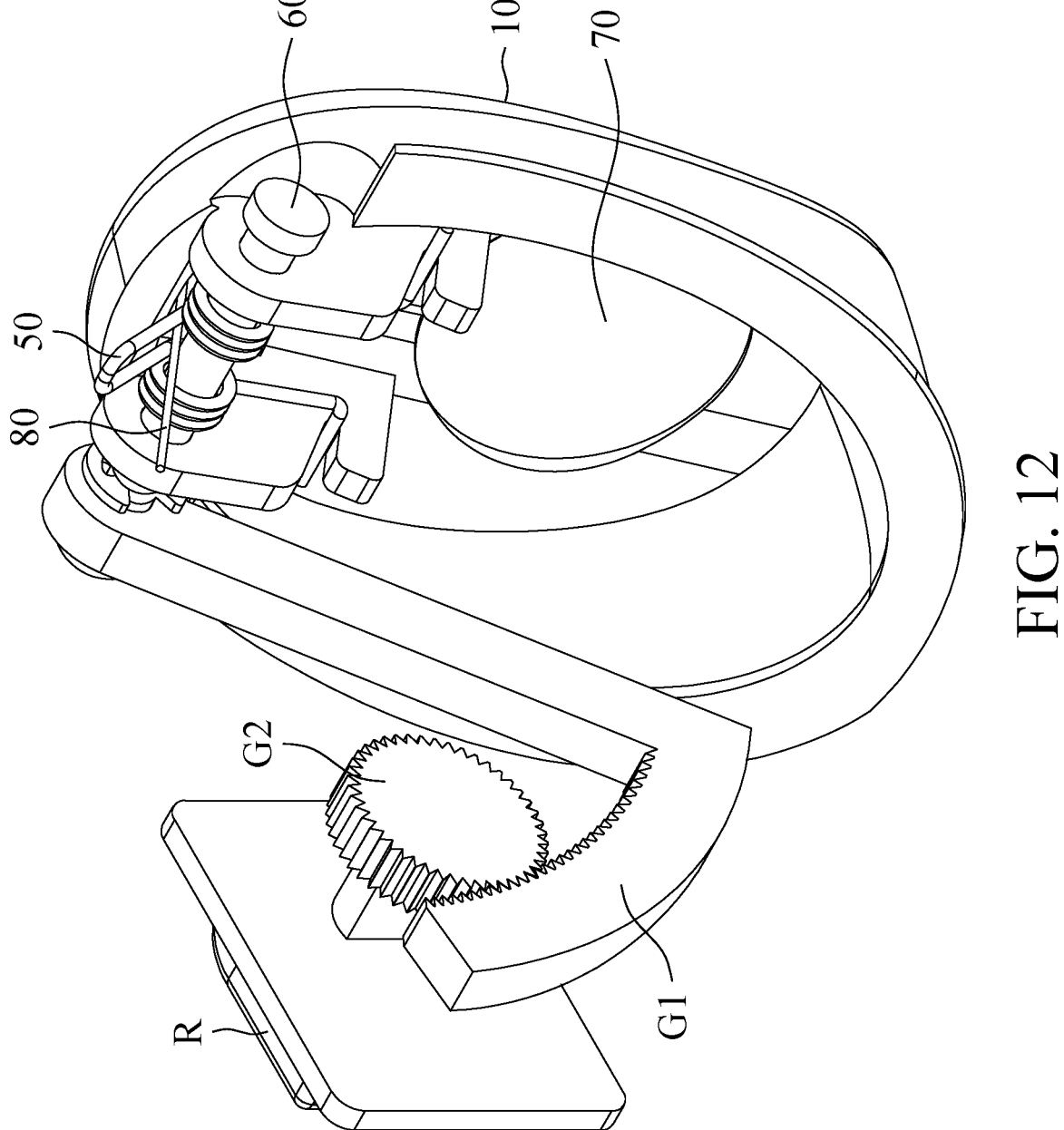
FIG. 12 is a schematic diagram of the hinge 60 connected to the variable resistor R via the gear rack G1 and the gear G2.

FIG. 11 is a schematic diagram of a button mechanism M1, in accordance with another embodiment of the invention. FIG. 12 is a schematic diagram of the hinge 60 connected to the variable resistor R via the gear rack G1 and the gear G2.

Referring to FIGS. 11-12, the button mechanism M1 is different from the button mechanism M of FIGS. 1-10 in that the button mechanism M1 further comprises a gear rack G1, a gear G2, and a variable resistor R that is connected to the gear G2.

In this embodiment, the hinge 60 is affixed to the movable member 10, an end of the gear rack G1 is affixed to an end of the hinge 60. The gear rack G1 has an L-shaped structure and is engaged with the gear G2. When the user presses the movable member 10, the hinge 60 and the gear rack G1 rotate along with the movable member 10, whereby the gear G2 is driven to rotate and change the resistance value of the variable resistor R. Therefore, the angular position of the movable member 10 can be promptly detected.

Figure 13:
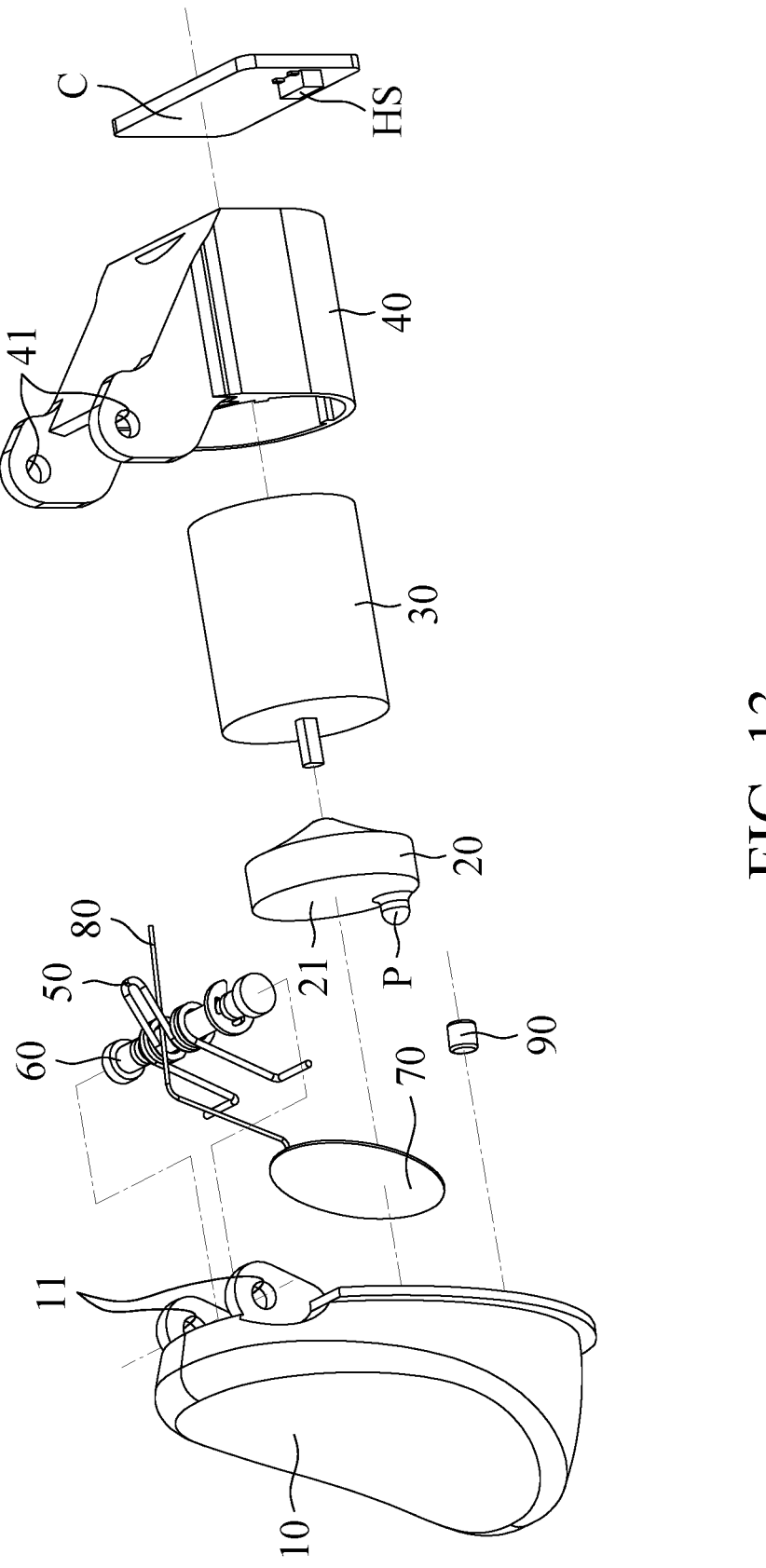
FIG. 13 is an exploded diagram of a button mechanism M2, in accordance with another embodiment of the invention.
Figure 14:
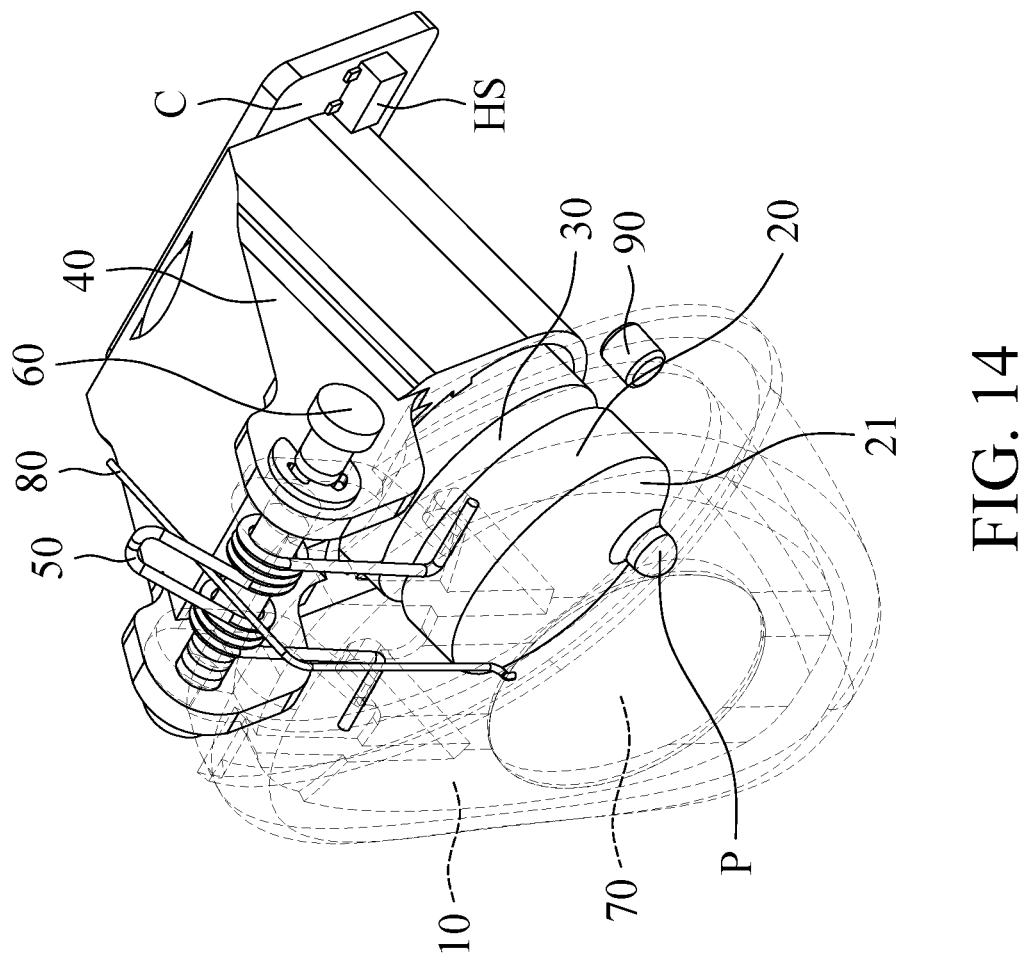
FIG. 14 is a schematic diagram of the button mechanism M2 in FIG. 13 after assembly.

FIG. 13 is an exploded diagram of a button mechanism M2, in accordance with another embodiment of the invention. FIG. 14 is a schematic diagram of the button mechanism M2 in FIG. 13 after assembly.

Referring to FIGS. 13-14, the button mechanism M2 is different from the button mechanism M of FIGS. 1-10 in that the button mechanism M2 further comprises a circuit board C, a magnetic field sensor HS, and a magnetic element 90.

In this embodiment, the circuit board C is mounted on the frame 40, the magnetic field sensor HS is disposed on the circuit board C, and the magnetic element 90 is disposed on a side of the movable member 10 and faces the magnetic field sensor HS.

When the user presses the movable member 10, the magnetic element 90 on the movable member 10 moves toward the magnetic field sensor HS on the circuit board C and changes the magnetic field in the 3D space. Therefore, the angular position of the movable member 10 can be promptly determined by the magnetic field sensor HS detecting variation of the magnetic field. For example, the magnetic field sensor HS may comprise a Hall effect sensor.

Figure 15:
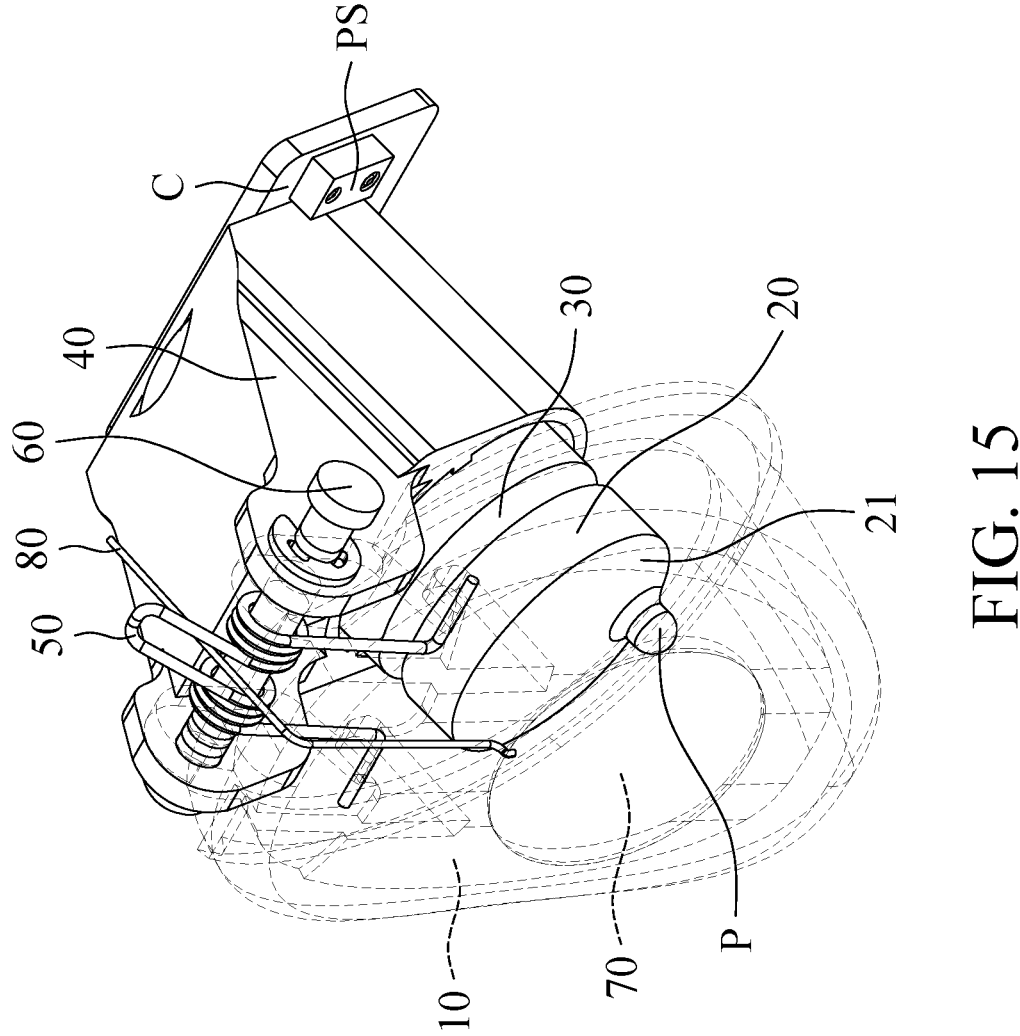
FIG. 15 is an exploded diagram of a button mechanism M3, in accordance with another embodiment of the invention.

FIG. 15 is an exploded diagram of a button mechanism M3, in accordance with another embodiment of the invention.

Referring to FIG. 15, the button mechanism M3 is different from the button mechanism M of FIGS. 1-10 in that the button mechanism M3 further comprises a circuit board C and a proximity sensor PS.

In this embodiment, the circuit board C is mounted on the frame 40, and the proximity sensor PS is disposed on the circuit board C. When the user presses the movable member 10, the movable member 10 moves toward the proximity sensor PS on the circuit board C. The proximity sensor PS can detect the distance variation between the movable member 10 and the proximity sensor PS to determine the angular position of the movable member 10.

In summary, the invention provides a gaming joystick and button mechanism thereof. When the movable member 10 moves relative to the frame 40 in the first direction D1 to the trigger position, the protrusion P of the rotary member 20 abuts the contact surface S of the movable member 10 (or the metal piece 70 disposed on the movable member 10), and the motor 30 impels the rotary member 20 to rotate so that the movable member 10 is pushed back, so that it moves in the second direction D2. Therefore, the users can have good tactile feedback when playing games with the gaming joystick.

When the user presses the movable member 10, the pressing angle detection module (including the variable resistor R, the magnetic field sensor HS, or the proximity sensor PS) can detect the pressing angle (depth) of the movable member 10 and then actuate the motor 30 to perform the function of active force feedback. In some embodiments, when the pressing angle (depth) of the movable member 10 exceeds 50% of the button stroke (defined by the mechanical designer), the motor 30 can be actuated to rotate and simulate realistic recoil (active damping/vibration resistance force) of conventional firearms (e.g. pistols or machine guns).

In some embodiments, when the pressing angle detection module detects a specific pressing angle (depth) of the movable member 10, the protrusion P of the rotary member 20 can rapidly rotate from 12 o'clock position to 6 o'clock position, whereby the movable member 10 suddenly descends to simulate a single shot feeling from the pistol.

In some embodiments, the protrusion P may comprise a universal ball roller that is disposed on the rotary member 20 to reduce the friction between the protrusion P and the contact surface S of the movable member 10 (or the metal piece 70 on the movable member 10). Therefore, functional efficiency and life of the button mechanism can be improved.

With the included angle between the main surface 21 of the rotary member 20 and the contact surface S of the movable member 10 (or the metal piece 70 on the movable member 10) ranged from 5 to 15 degree, an efficient reduction mechanism can be achieved to increase the toque output for pushing the movable member 10 back in the second direction D2. Therefore, the users can have good tactile feedback experience when playing games with the gaming joystick 100 (e.g. simulating the resistance force when drawing the bow or recoil feeling of pistol or sniper rifle). Specifically, since the button mechanism is modularized, the cost of production and maintenance can be greatly reduced, and miniaturization of the button mechanism can also be achieved to fit in various kinds of controllers.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A button mechanism, comprising:
a frame;
a motor, disposed on the frame;
a rotary member, connected to the motor;

a protrusion, including a universal ball roller disposed on a main surface of the rotary member; and
a movable member, hinged to the frame and having a contact surface;
wherein when the movable member moves relative to the frame from an initial position in a first direction to a triggering position, the protrusion contacts the contact surface of the movable member, and the rotary member is driven by the motor to rotate, whereby the protrusion pushes the movable member by in a second direction, and the second direction is the opposite of the first direction.

2. The button mechanism as claimed in claim 1, wherein when the movable member moves in the first direction relative to the frame from the initial position to the triggering position, the rotary member is driven by the motor to rotate from a first angle to a second angle, and the protrusion moves from a 6 o'clock position on the main surface to a 12 o'clock position on the main surface.

3. A button mechanism, comprising:
a frame;
a motor, disposed on the frame;
a rotary member, connected to the motor;
a protrusion, including a universal ball roller disposed on a main surface of the rotary member;
a movable member, hinged to the frame; and
a metal piece, affixed to the movable member, wherein when the movable member moves in a first direction relative to the frame from the initial position to the triggering position, the protrusion contacts the metal piece, and the rotary is driven by the motor to rotate, whereby the protrusion pushes the movable member in a second direction, and the second direction is the opposite of the first direction.

4. The button mechanism as claimed in claim 3, further comprising a gear rack connected to the movable member, a gear engaged with the gear rack, and a variable resistor connected to the gear, wherein when the movable member moves relative to the frame, the gear is driven by the movable member to rotate via the gear rack and change the resistance value of the variable resistor.

5. The button mechanism as claimed in claim 3, further comprising a circuit board affixed to the frame, a magnetic field sensing element disposed on the circuit board, and a magnetic element disposed on the movable member.

6. The button mechanism as claimed in claim 3, further comprising a circuit board and a proximity sensor, wherein the circuit board is affixed to the frame, and the proximity sensor is disposed on the circuit board to detect the position of the movable member.

7. The button mechanism as claimed in claim 3, further comprising a conductive wire electrically connected to the metal piece.

8. A gaming joystick, comprising:
a housing; and
the button mechanism of claim 3, wherein the movable member is exposed to a side of the housing.

9. The gaming joystick as claimed in claim 8, wherein the button mechanism further comprises a resilient member connecting the movable member to the housing.

* * * * *